United States Patent [19]
Lunsford

[11] Patent Number: 5,035,189
[45] Date of Patent: Jul. 30, 1991

[54] REFUSE RECYCLING SYSTEM

[76] Inventor: T. J. Lunsford, 11668 Hi Ridge Rd., Lakeside, Calif. 92040

[21] Appl. No.: 562,681

[22] Filed: Aug. 3, 1990

[51] Int. Cl.⁵ .................................................. F23G 5/04
[52] U.S. Cl. .................................... 110/346; 110/224; 110/226; 432/1
[58] Field of Search ............... 110/210, 222, 224, 226, 110/342, 346; 432/1

[56] References Cited

U.S. PATENT DOCUMENTS

| | | | |
|---|---|---|---|
| 2,102,427 | 12/1937 | Lloyd | 110/224 |
| 2,148,447 | 2/1939 | Dundas | 110/226 |
| 2,171,535 | 9/1939 | Berg | 110/226 |
| 3,670,669 | 6/1972 | Hoad | 110/226 |
| 3,985,086 | 10/1976 | De Tola | 110/224 |
| 4,410,086 | 10/1983 | Simpson | 206/366 |
| 4,561,860 | 12/1985 | Gulley | 110/224 |
| 4,662,516 | 5/1987 | Baker, Sr. et al. | 206/363 |

Primary Examiner—Henry C. Yuen
Attorney, Agent, or Firm—David J. Harshman

[57] ABSTRACT

A system for recycling refuse comprises mixing a predetermined amount of refuse with a predetermined amount of plastic, heating the mixture until the plastic becomes liquid, forming the liquified mixture into a desired shape such as a brick, and cooling the mixture. This results in a solid brick in which the refuse is encapsulated, and the brick can be used in construction. Prior to mixing, the refuse may be dried and ground to a particulate size as may be desired. The plastic may be preheated prior to the mixing step to aid in forming the desired shape of the article which uses the refuse in its encapsulated form.

6 Claims, 1 Drawing Sheet

REFUSE RECYCLING SYSTEM

FIELD OF THE INVENTION

This invention relates generally to systems for processing refuse. In particular, the invention relates to a method and apparatus for transforming refuse into articles which serve a useful purpose. The invention is particularly, though not exclusively, useful for manufacture of components used in construction of homes, buildings, roads, and the like.

BACKGROUND OF THE INVENTION

The problem of disposing of refuse and garbage generated by society has plagued the human race for centuries. Recently, the problem has become even more acute in our industrialized society, both in the United States and world wide. As more and more countries become industrialized and become efficient at producing consumable items, more and more refuse and trash is generated. In addition, as the population of the world grows at an ever-increasing rate, so does the problem of disposal of refuse.

There have been many proposals of late to solve the problem of handling the tons of garbage produced every day. A solution which is very common is to transport the refuse to a landfill or other dump site and leave it. Unfortunately, the land available for such sites, and the willingness of landowners to allow such activity to occur is becoming more and more scarce. As available landfill sites are becoming filled to capacity, the problem is becoming more acute. For example, in New York City, available land has been exhausted and the city is forced to place the refuse on barges which is then transported by sea to other locations. Such a process is very costly, and also has a high risk of unwanted dumping of the refuse in the ocean, which pollutes the water. On the other hand, continued dumping of refuse in a landfill can be a health hazard to surrounding areas and a breeding ground for bacteria and other medically unsafe conditions. In addition, there is a danger of unsafe materials leaching into the ground water of the land underneath and surrounding the landfill site.

Another approach to try to eliminate the need for landfills, or at least reduce the amount of refuse which needs to be stored is to burn the refuse. This has been accomplished for many, many years. Unfortunately, the process of burning refuse causes polluting particles and smoke to be released into the atmosphere and environment which is undesirable. Various systems have been developed which attempt to burn the garbage in a cleaner fashion, and even convert the garbage to electricity in the process. However, these systems still have not been proven to be able to do so cleanly and efficiently in an ecologically sound manner. In addition, such systems typically require that the refuse be separated prior to burning, to separate the combustible materials from the noncombustible materials. Otherwise, the system would be inefficient and require constant cleaning of the ovens used to burn the refuse.

Further attempts have been made to raise the consciousness of individuals with respect to refuse disposal and recycling of materials to reduce waste of natural resources. This has included separating aluminum cans for recycling purposes, as well as glass bottles for recycling purposes. Plastic containers and styrofoam cups have been singled out also as contributing to the growing volume of refuse problems at landfill since such materials do not biodegrade. Theoretically, the refuse deposited at a landfill is supposed be biodegradable so that it returns to its original environmentally compatible state. Consequently, there has been much discussion regarding biodegradable plastic materials, such as containers for food as well as trash bags and other plastic containers. Unfortunately, such biodegradable claims have yet to be proven. Moreover, even if such biodegradable plastic materials could be devised, they still do not solve the problem of the fact that the material, whether biodegradable or not, must be disposed of in one fashion or another.

The present invention recognizes the need for processing refuse in such a fashion that the disposal problem is virtually eliminated. The present invention further recognizes that this can be accomplished by using the refuse as raw material in a process for constructing useful articles. This includes processing the refuse so that it is encapsulated in a plastic material constructed to provide necessary characteristics for its intended purpose, in construction for example.

Accordingly, it is an object of the present invention to provide a system for recycling refuse which produces strong and durable construction materials. It is yet another object of the present invention to provide a system for recycling refuse which can use all types of refuse material as may be desired. It is yet another object of the present invention to recycle refuse to produce building materials which provide good insulation properties and do not pose any additional sanitary and health risks. Still another object of the present invention is to provide a system and apparatus for recycling refuse which is cost effective and reliable in use and operation.

SUMMARY OF THE INVENTION

The system for recycling refuse includes the steps of providing a specified amount of refuse material, providing a specified amount of plastic material, and mixing the specified amounts of plastic material with the specified amounts of refuse material. The mixture is heated to a temperature sufficient to melt the plastic material so that it envelops the specified amount of refuse material. The mixture is then cooled to solidify the plastic and encapsulate the refuse. The plastic may be preheated prior to the mixing step. In addition, a mold can be used to form the liquified mixture into blocks, bricks, wall shapes, and other useful articles as desired.

In one embodiment of the invention, the refuse is dried, such as by heat tumbling or a freeze drying process. The dried refuse is then ground into smaller sized particles appropriate to fit into the size of the block, brick, or other article being manufactured.

The present invention further provides a system for carrying out the above steps.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
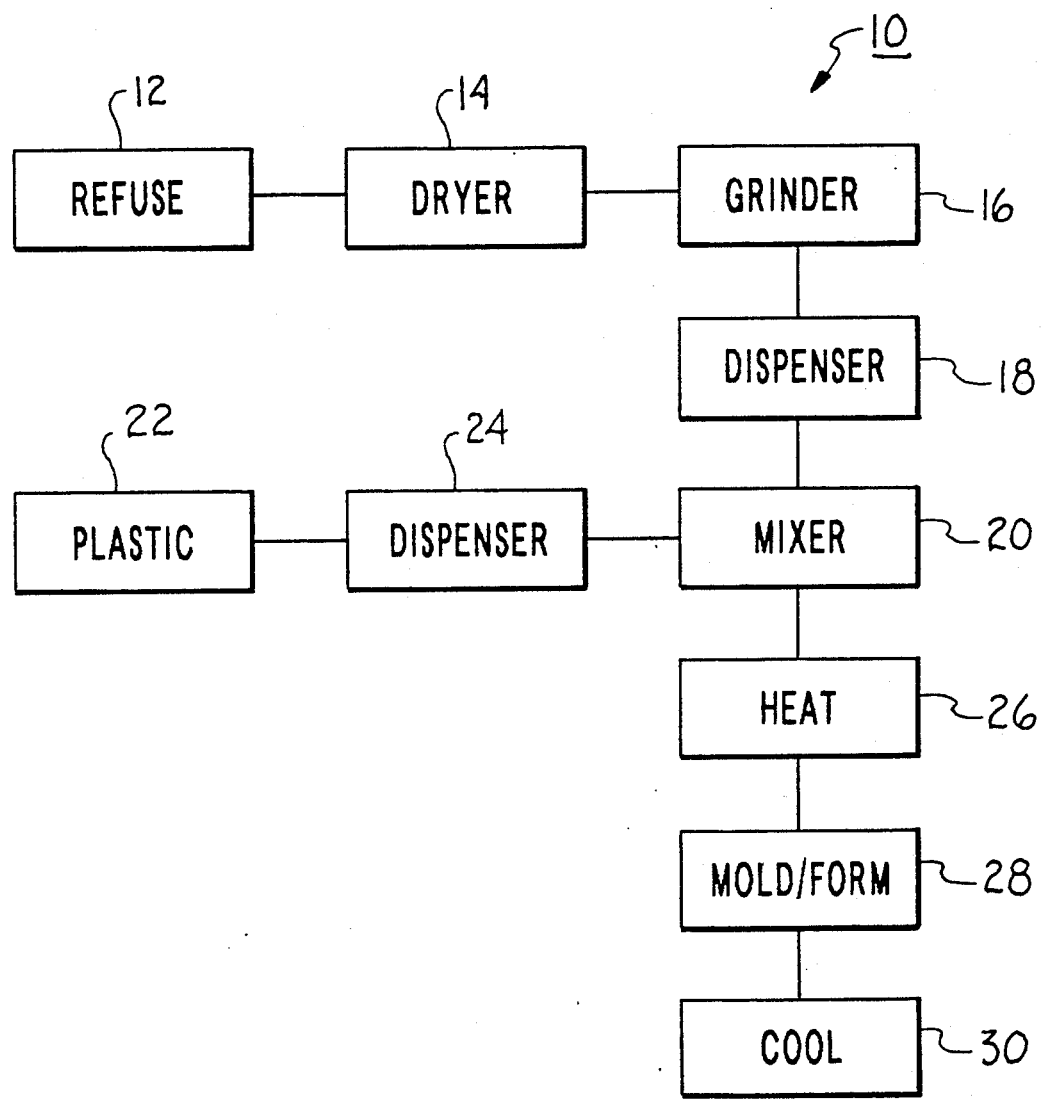
FIG. 1 is a schematic diagram of one embodiment of a system for recycling refuse in accordance with the present invention.

Referring now to FIG. 1 there is shown a system for recycling refuse in accordance with the present invention, generally designated 10. Refuse 12 is provided as raw material input for the system. The present invention contemplates that the refuse is garbage and trash such as from private households and businesses. This would include all of the components usually found in such refuse, including waste paper, metal cans, aluminum cans, glass, food, plastic containers, wood scraps, and the like. Whether or not the refuse is biodegradable is not a concern with respect to this process. The refuse may be separated into components of glass versus metal versus plastic if it is so desired, but such separation is not necessary for realizing the benefits of the present invention.

Refuse 12 is preferably supplied next to a dryer 14 for removing moisture from the refuse. While the process of the present invention can still be practiced without drying the refuse, it is preferable that the refuse be dried to eliminate problems which can develop if moisture is in the refuse as will be appreciated from further description below. In any event, dryer 12 can be any conventional known process of drying, such as heat tumbling of the refuse, or a freeze drying process.

Once the refuse has passed through the driving stage, it is supplied to a grinder 16. Grinder 16 can be a conventional grinding device for grinding or pulverizing the dried refuse into particles of a desired size, depending on the article into which the refuse is to be incorporated. The grinder can use teeth or conventional shredding mechanism or other apparatus for breaking the refuse into smaller sizes, as is well known in the art. Furthermore, it is contemplated that the entire process being described herein is accomplished by the use of conveyors continually moving the refuse and other materials through the process to maximize efficiency. Once the refuse has been processed to the desired size, a dispensing apparatus 18 dispenses the appropriate amount of refuse into a mixer 20. Mixer 20 is a device which can controllably mix the refuse in with additional material described below.

In particular, there is further provided in accordance with the present invention, plastics material 22. In one embodiment according to the present invention, plastics material 22 is provided in the form of a particulate. It may be scrap plastic which is ground up into smaller sizes, the scrap plastic having been salvaged from refuse material 12. In other instances, the plastic material may be raw material plastic in various forms, such as polypropylene, polyvinylflouride, and other poly plastic materials. It is contemplated that the plastic would be in solid form. However, in the alternative, the plastic could be preheated and possibly be in a melted, semi-liquid form. In any event, plastics 22 is next dispensed by dispenser 24 in the appropriate predetermined quantity. The amount and rate of plastic dispensed from dispenser 24, whether in solid particulate, or a liquified form, can be controlled when it is dispensed into mixer 20, along with the controlled amount of refuse being dispensed from dispenser 18 also into mixer 20.

It will be appreciated by the skilled artisan that the mixer 20 can be any conventionally known mixing apparatus for mixing the refuse with the plastic in sufficient amounts so that the plastic material is sufficient to envelope the refuse material. In addition, the refuse can be added to the plastic in such a way that the mixture of plastic and refuse material can be evenly distributed and homogenous, or can have more refuse material in the center of the mixing apparatus so that the plastic will tend to be accumulated on the walls of the mixing apparatus and encase the refuse before it is next used in its following step. A mixing process then takes place in mixer 20 as desired until the proper consistence and mixture is obtained.

The mixture from mixer 20 is then heated in step 26 to a temperature sufficient to liquify the plastic so that the refuse is effectively, thoroughly bonded into the plastic. Depending upon the results desired, the temperature can be varied to accommodate the particular mixture being heated. A temperature of 300 to 400 degrees Fahrenheit is in most proper bonding to occur. However, higher or lower temperatures could be accommodated in accordance with the present invention. The heated mixture of refuse and plastic in heater 26 is then fed into a mold or forming apparatus 28 for molding or forming the heated mixture to the appropriate shape. During this process, the plastic material in its liquid or semi-liquid form can be used to encapsulate totally the refuse material. Also in this molding or forming process step 28, the various desired shapes of the molded, recyclable article can be determined. This can take various shapes such as bricks, interlocking blocks, portions of walls, or other materials used for buildings, roads, homes, or whatever various construction element is desired. Moreover, during this step, various colorings and texturing of the surface can be accomplished for aesthetic purposes as may be desired. Once the appropriate shape has been determined and the mold has been made, the material still heated is released into a cooling apparatus 30, for accomplishing a cooling step. In the process of cooling, the molded plastic solidifies. The refuse material is thus then totally encapsulated within the plastic article.

While the particular refuse recycling system as herein shown and disclosed in detail is fully capable of obtaining the objects and providing the advantages herein before stated, it is to be understood that it is merely illustrative of the presently-preferred embodiments of the invention and that no limitations are intended to the details of construction or design herein shown other than as defined in the appended claims.

What is claimed is:

1. A process for recycling refuse, comprising providing a specified amount of refuse material;
   providing a specified amount of plastic material;
   mixing said specified amount of plastic material with said specified amount of refuse material;
   heating and mixture of refuse and plastic materials to a temperature sufficient to melt said specified amount of plastic material to envelop said specified amount of refuse material;
   molding said heated mixture into a desired shape; and
   cooling said mixture to solidify said plastic for encapsulating said refuse to produce a solid useful article.

2. A process for recycling refuse as in claim 1 wherein said plastic is preheated prior to said mixing step.

3. A process for recycling refuse as in claim 1 further comprising the step of drying said refuse prior to said mixing step.

4. A process for recycling refuse as in claim 3 wherein said drying step comprises heat tumbling said refuse.

5. A process for recycling refuse as in claim 3 wherein said crying step comprises quick freezing said refuse.

6. A process for recycling refuse as in claim 1 further comprising the step of grinding said refuse into a particulate form prior to said mixing step.

* * * * *